(12) United States Patent
Eldawy (10) Patent No.: US 9,740,393 B2
(45) Date of Patent: Aug. 22, 2017

(54) PROCESSING A HOVER EVENT ON A TOUCHSCREEN DEVICE

(75) Inventor: Mohamed S. Eldawy, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 251 days.

(21) Appl. No.: 13/475,690

(22) Filed: May 18, 2012

(65) Prior Publication Data

US 2015/0205515 A1 Jul. 23, 2015

(51) Int. Cl.
*G06F 3/0488* (2013.01)

(52) U.S. Cl.
CPC .................. *G06F 3/0488* (2013.01)

(58) Field of Classification Search
CPC ....... G06F 2203/04808; G06F 3/04817; G06F 3/0482; G06F 3/0488
USPC ....................................................... 715/866
See application file for complete search history.

(56) References Cited

U.S. PATENT DOCUMENTS

| | | | |
|---|---|---|---|
| 2003/0043194 A1* | 3/2003 | Lif | G06Q 10/02 715/764 |
| 2007/0214119 A1* | 9/2007 | Ray et al. | 707/3 |
| 2009/0273565 A1* | 11/2009 | Garside et al. | 345/168 |
| 2010/0105443 A1 | 4/2010 | Vaisanen | |
| 2010/0107067 A1 | 4/2010 | Vaisanen | |
| 2011/0087966 A1* | 4/2011 | Leviathan | 715/745 |
| 2012/0198320 A1* | 8/2012 | Newell | G06F 17/30873 715/205 |
| 2012/0218200 A1* | 8/2012 | Glazer et al. | 345/173 |
| 2012/0232791 A1* | 9/2012 | Sterkel et al. | 701/454 |
| 2013/0024811 A1* | 1/2013 | Gleadall et al. | 715/810 |

\* cited by examiner

*Primary Examiner* — Li Sun
*Assistant Examiner* — Terri Filosi
(74) *Attorney, Agent, or Firm* — McDermott Will & Emery LLP (57) ABSTRACT

A system and method for processing a hover event on a touchscreen device includes obtaining web page data on the touchscreen device. Content corresponding to the web page data is displayed on a touchscreen of the touchscreen device. A determination is made if the web page data includes a web page element associated with a hover event. If the web page data includes the web page element associated with the hover event, a hover button is displayed on the touchscreen in association with the displayed content corresponding to the web page data.

17 Claims, 6 Drawing Sheets

PROCESSING A HOVER EVENT ON A TOUCHSCREEN DEVICE

FIELD

The subject technology generally relates to touchscreen devices and, in particular, relates to processing a hover event on a touchscreen device.

BACKGROUND

A traditional Windows, Icons, Menus, Pointer (WIMP) device may offer a mouse pointer, left and right mouse buttons, a scroll wheel, keyboard scroll keys, and keyboard modifiers. A touchscreen device, on the other hand, generally relies on touch on the screen to send commands to the system. However, in some cases, the underlying touch system is similar to the WIMP system and requires similar control information.

There is typically no equivalent for hover events (e.g., mouseover events and/or mouseout events) on touchscreen devices. For example, this can be problematic for touchscreen browsers, since hovering may be provided for by languages such as Javascript, HTML, and Cascading Style Sheet (CSS). Websites may use mouseover and/or mouseout events for various certain objects (e.g. menu opens on hover, content is displayed on hover), but pressing on the touchscreen may be ambiguous as it is unclear whether the user is tapping or hovering over the object. In general, a press on the displayed object is treated as a regular mouseclick event (e.g., jumping to another page).

SUMMARY

The disclosed subject matter relates to a machine-implemented method for processing a hover event on a touchscreen device. The method comprises obtaining web page data on the touchscreen device, and displaying content corresponding to the web page data on a touchscreen of the touchscreen device. The method further comprises determining if the web page data includes a web page element associated with a hover event, and displaying, if the web page data includes the web page element associated with the hover event, a hover button on the touchscreen in association with the displayed content corresponding to the web page data.

The disclosed subject matter further relates to a touchscreen device comprising a touchscreen, one or more processors, and a machine-readable medium comprising instructions stored therein, which when executed by the processors, cause the processors to perform operations comprising obtaining application data. The operations further comprise displaying content corresponding to the application data on the touchscreen, determining if the application data includes an application element associated with a hover event, and displaying, if the application data includes the application element associated with the hover event, a hover button on the touchscreen together with the displayed content corresponding to the application data.

The disclosed subject matter also relates to a machine-readable medium comprising instructions stored therein, which when executed by a system, cause the system to perform operations comprising obtaining application data, and displaying content corresponding to the application data on a touchscreen. The operations further comprise determining if the application data includes an application element associated with a hover event, and displaying, if the application data includes the application element associated with the hover event, a hover button on the touchscreen together with the displayed content corresponding to the application data. In addition, the operations comprise receiving a first user touch input corresponding to the displayed hover button, receiving a second user touch input corresponding to the application element, and performing, in response to receiving the first user touch input and the second user touch input, an operation associated with the hover event.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The disclosed subject matter describes systems and techniques for processing a hover event on a touchscreen device. Application data (e.g., web page data) is obtained on the touchscreen device. Content corresponding to the application data is displayed on a touchscreen of the touchscreen device. A determination is made if the application data includes an application element (e.g., a web page element) associated with a hover event. If the application data includes the application element associated with the hover event, a hover button is displayed on the touchscreen together with the displayed content corresponding to the application data.

A first user touch input corresponding to the displayed hover button can be received, and a second user touch input corresponding to the web page element can be received. In response to receiving the first user touch input and the second user touch input, an operation associated with the hover event (e.g., displaying hover content such as alternative (ALT) content, opening the menu on a hover) can be performed.

Figure 1:
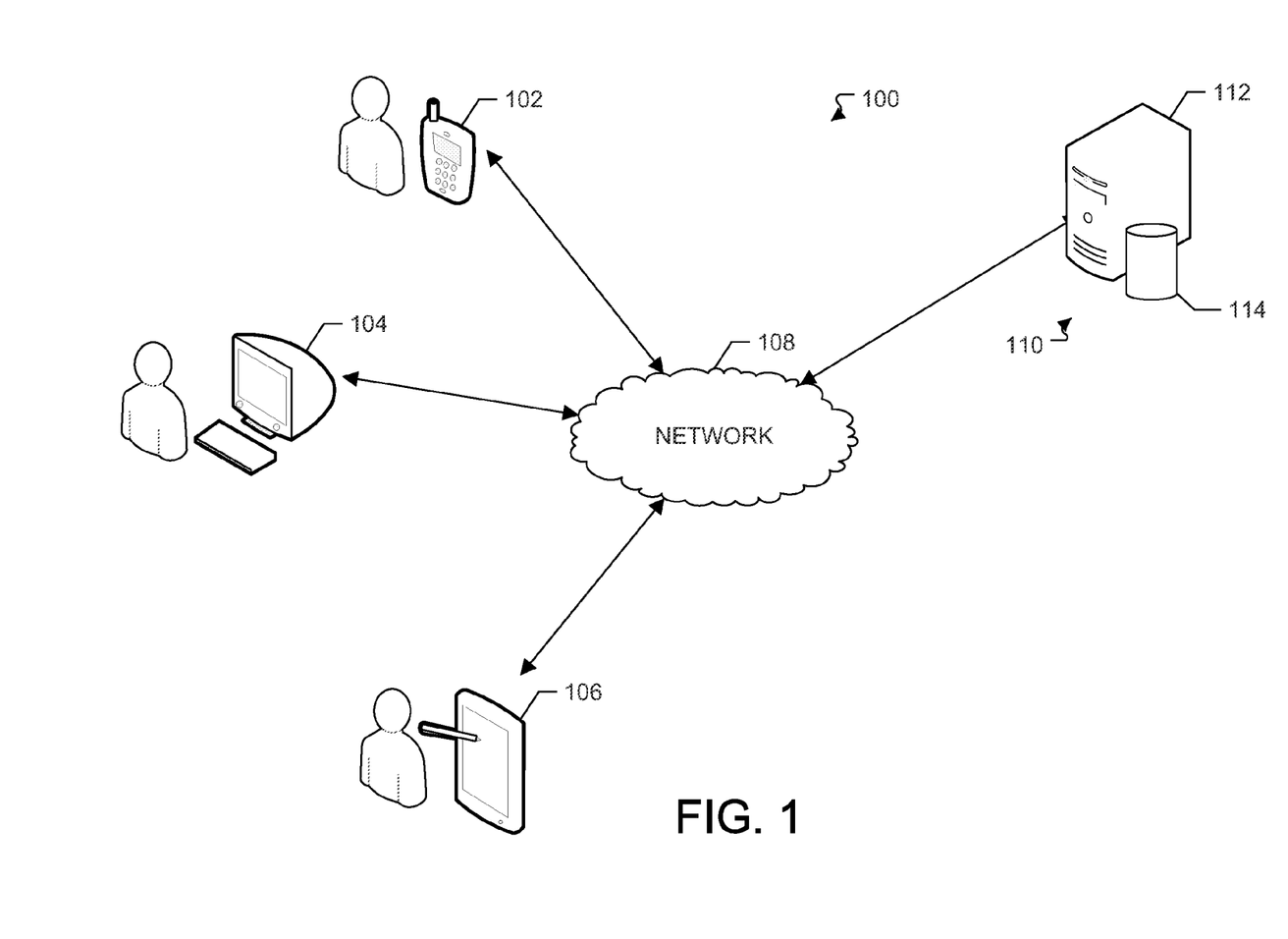
FIG. 1 illustrates an example distributed network environment which can provide for processing a hover event on a touchscreen device.

FIG. 1 illustrates an example distributed network environment which can provide for processing a hover event on a touchscreen device. A network environment 100 includes a number of electronic devices 102-106 communicably connected to a server 110 by a network 108. Each of electronic devices 102-106 can include a touchscreen, which can be built into the device itself or can be electronically connected to the device (e.g., as a peripheral device). Server 110 includes a processing device 112 and a data store 114. Processing device 112 executes computer instructions stored in data store 114, for example, to provide content (e.g., a website or other display content) to any of electronic devices 102-106.

In some example aspects, each of the electronic devices 102-106 may be any machine with appropriate hardware/software to process a hover event. The term "hover event" as used herein encompasses its plain and ordinary meaning, including, but not limited to, a graphical user interface (GUI) event that is raised when a user moves or hovers a pointer over a particular area of the GUI. For example, a hover event can correspond to a mouseover event and/or a mouseout event. In response to detecting a hover event, a corresponding action is taken. For example, ALT text can displayed (e.g., a tooltip), or the GUI can be otherwise altered (e.g., by opening a menu).

Electronic devices 102-106 can be mobile devices (e.g., smartphones, tablet computers, PDAs, and laptop computers), portable media players, desktop computers or other appropriate computing devices. In the example of FIG. 1, electronic device 102 is depicted as a smartphone, electronic device 104 is depicted as a desktop computer, and electronic device 106 is depicted as a tablet computer.

In some example aspects, any of the electronic devices 102-106 may obtain application data (e.g., web page data), and content corresponding to the application data can be displayed on a touchscreen of the electronic device (e.g., 102-106). The content corresponding to the application data can include an image (e.g., a map, a graph, a picture, etc.). The content can also include text (e.g., a document, an article, etc.) or a web link. Of course, other types of content can also be obtained. In some example aspects, the content can be transmitted from server 110 via the network 108 to the electronic devices 102-106. In other example aspects, the content can be stored in a storage component (e.g., hard disk, RAM, ROM, etc.) of the respective electronic devices 102-106.

A determination can be made if the application data includes an application element associated with a hover event. If the application data includes the application element associated with the hover event, a hover button can be displayed on the touchscreen together with the displayed content corresponding to the application data.

Server 110 may be any system or device having a processor, a memory, and communications capability for providing content to the electronic devices. In some example aspects, server 110 can be a single computing device such as a computer server. In other embodiments, server 110 can represent more than one computing device working together to perform the actions of a server computer (e.g., cloud computing).

Network 108 can include, for example, any one or more of a cellular network, a satellite network, a personal area network (PAN), a local area network (LAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

Figure 2A:
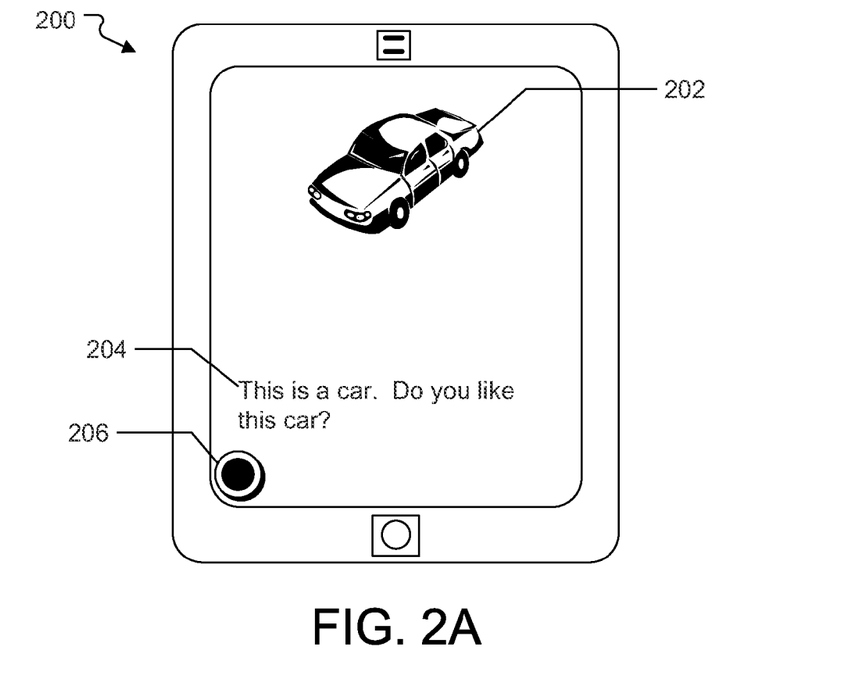
FIGS. 2A-2B illustrate an example of screenshots in which hover content is processed on a touchscreen device.
Figure 2B:
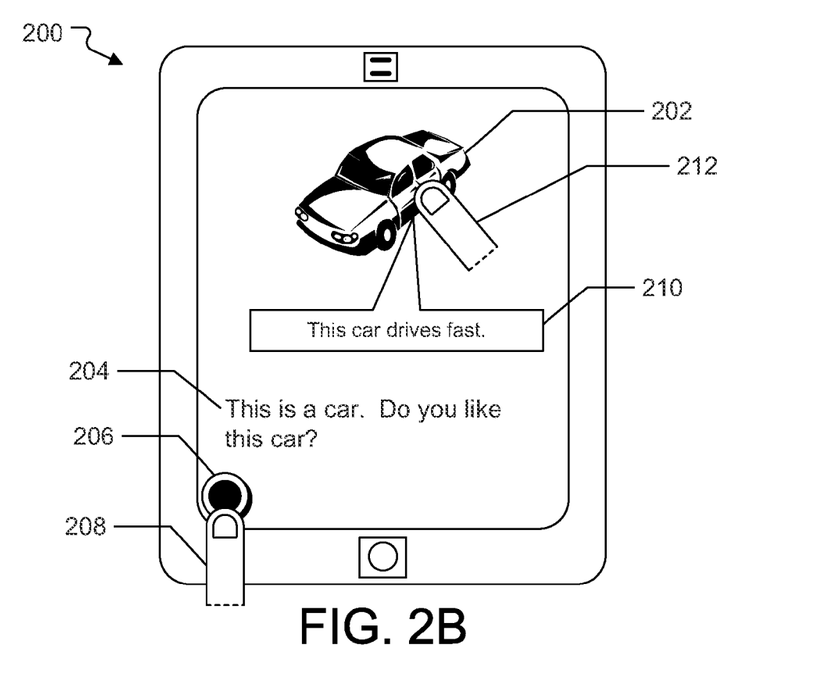

FIGS. 2A-2B illustrate an example of screenshots in which hover content is processed on a touchscreen device. FIG. 2A depicts an electronic device 200 (e.g., any of electronic devices 102-406) which includes a touchscreen. The touchscreen displays content which, for example, corresponds to application data. For example, the application data can correspond to web page data obtained from server 110. In another example, the application data can correspond to data obtained from local storage on electronic device 200.

The content displayed on the touchscreen of electronic device 200 can include application elements associated with a hover event. For example, hover events (e.g., mouseover and/or mouseout events) can be defined in different programming languages, including, but not limited to Javascript, HTML and CSS. Electronic device 200 can determine if the application data includes such an application element associated with a hover event. In the example of FIG. 2A, image 202 corresponds to an application element associated with a hover event, and regular text 204 corresponds to an application element which is not associated with a hover event.

In determining that the application data includes an application element (e.g., image 202) associated with a hover event, electronic device 200 can display a hover button 206 on the touchscreen, together with the displayed content (e.g., image 202, regular text 204) corresponding to the application data. For example, hover button 206 can be displayed in a corner of the touchscreen. However, hover button 206 is not limited to this area of the touchscreen and can be displayed elsewhere. Hover button 206 provides a user of electronic device 200 with the option to trigger the hover event associated with image 202.

With reference to FIG. 2B, upon pressing hover button 206 (e.g., with a first finger 208) and an area on or near image 202 (e.g., with a second finger 212), the hover event associated with image 202 can be triggered and a corresponding operation can be performed. The presses on the touchscreen can occur at different times, such that the pressing of hover button 206 completes before the pressing of the area on or near image 202 begins. Alternatively, these presses can overlap each other, such that the pressing of the area on or near image 202 begins before the pressing of hover button 206 completes.

Regarding the operation performed based on the hover event, hover content 210 associated with image 202 can be displayed. It should be noted that the display of hover content 210 is one example of an operation performed in association with the hover event, and that other operations e.g., opening a menu on a hover) can be performed instead. In another example aspect, if the area on or near image 202 is pressed but the hover button 206 is not pressed, a regular mouseclick event (e.g., a non-hover event) can be triggered, and a corresponding operation can be performed (e.g., jumping to another web page).

Figure 3:
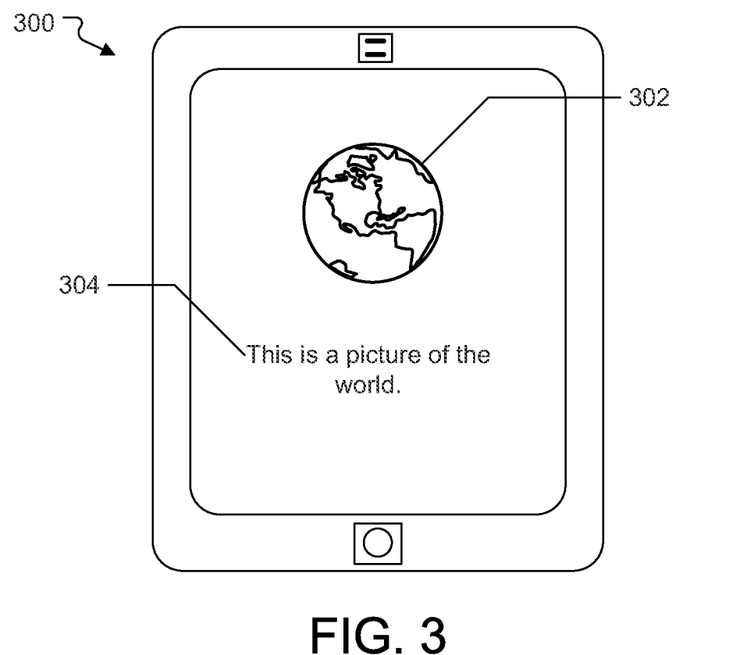
FIG. 3 illustrates an example screenshot of an application with no hover content.

FIG. 3 illustrates an example screenshot of an application with no hover content. FIG. 3 depicts an electronic device 300 (e.g., any of electronic devices 102-106) which includes a touchscreen. The touchscreen displays content which, for example, corresponds to application data. For example, the application data can correspond to web page data obtained from server 110. In another example, the application data can correspond to data obtained from local storage on electronic device 300.

Electronic device 300 can determine if the application data includes an application element associated with a hover event. For example, hover events (e.g., mouseover and/or mouseout events) can be defined in different programming languages, including, hut not limited to Javascript, HTML and CSS. In the example of FIG. 3, the content displayed on the touchscreen of electronic device 300 does not include application elements associated with a hover event. More particularly, the touchscreen includes an image 302 and regular text 304 as content, and this content does not have any hover events associated therewith.

In determining that the application data does not include an application element associated with a hover event, electronic device 300 can refrain from displaying a hover button. Thus, in the examples of FIGS. 2A-2B and FIG. 3, the hover button is displayed if the application data includes an application element associated with a hover event, and the hover button is not displayed if the application data does not include such an application element.

Figure 4A:
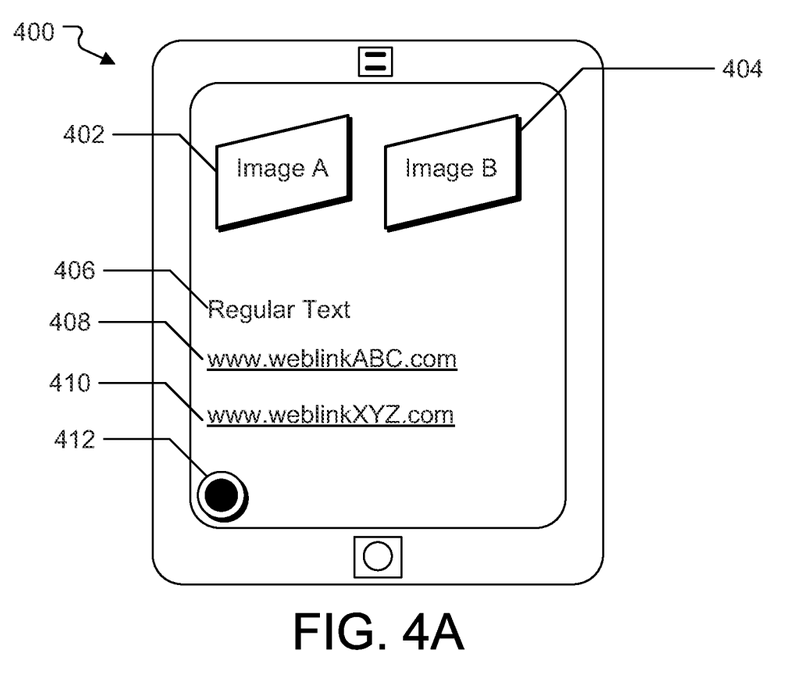
FIGS. 4A-4C illustrate an example of screenshots in which hover content is processed on a touchscreen device.
Figure 4B:
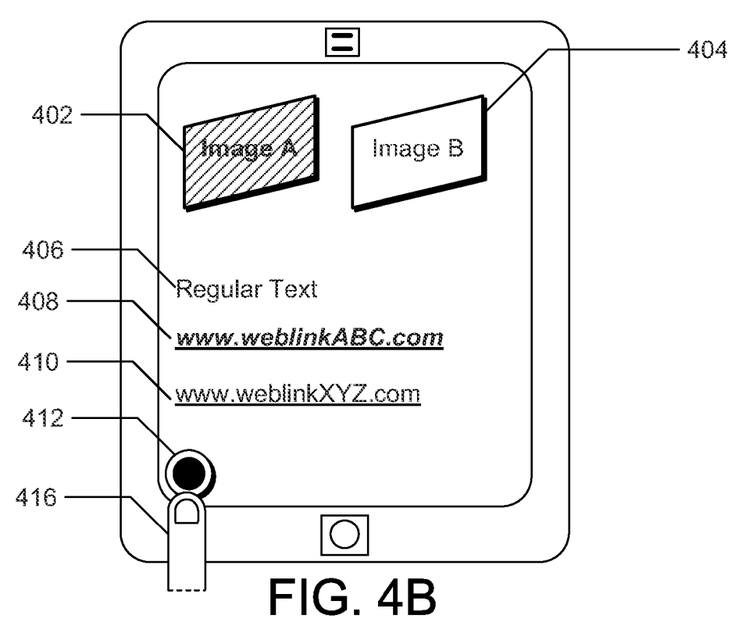
Figure 4C:
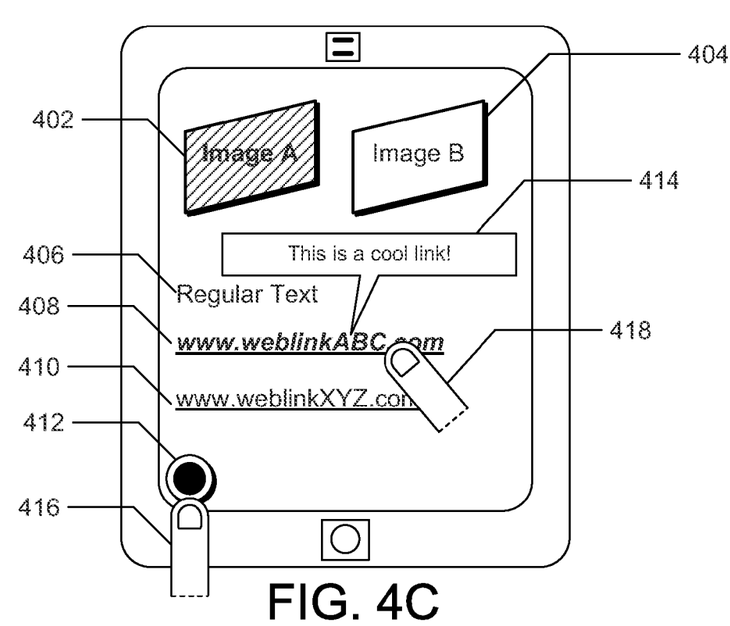

FIGS. 4A-4C illustrate an example of screenshots in which hover content is processed on a touchscreen device. FIG. 4A depicts an electronic device 400 (e.g., any of electronic devices 102-106) which includes a touchscreen. The touchscreen displays content which, for example, corresponds to application data. For example, the application data can correspond to web page data obtained from server 110. In another example, the application data can correspond to data obtained from storage local to electronic device 400.

The content displayed on the touchscreen of electronic device 400 can include application elements associated with a hover event. For example, hover events (e.g., mouseover and/or mouseout events) can be defined in different programming languages, including, but not limited to Javascript, HTML and CSS. Electronic device 400 can determine if the application data includes an application element associated with a hover event. In the example of FIG. 4A, image 402, and web link 408 correspond to application elements associated with respective hover events. On the other hand, image 404, regular text 406 and web link 410 correspond to application elements which are not associated with a hover event.

In determining that the application data includes at least one application element (e.g., image 402 and web link 408) associated with respective hover events, electronic device 400 can display a hover button 412 on the touchscreen, together with the displayed content (e.g., image 404, regular text 406 and web link 410) corresponding to the application data. For example, hover button 412 can be displayed in a corner of the touchscreen. However, hover button 412 is not limited to this area of the touchscreen and can be displayed elsewhere. Hover button 412 provides a user of electronic device 400 with the option to trigger the hover event associated with image 402.

With reference to FIG. 4B, electronic device 400 can provide for differentiated display of application elements having hover events associated therewith. In the example of FIG. 4B, the display of image 402 and web link 408 can be differentiated from the display of image 404, regular text 406 and web link 410. For example, image 402 and web link 408 can be highlighted. In another example, the other displayed content (e.g., image 404, regular text 406 and web link 410) can be dimmed. In this regard, the differentiation of display can be performed in association with pressing hover button 412 (e.g, with finger 416). However, the differentiation of display is not limited to pressing hover button 412, and can be provided for by other means (e.g., differentiate display all the time, differentiate display based on user-defined options).

In addition, with reference to FIG. 4C, upon pressing hover button 412 (e.g., with a first finger 416) and an area on or near web link 408 (e.g., with a second finger 418), the hover event associated with web link 408 can be triggered and a corresponding operation can be performed. These presses on the touchscreen can occur at different times, such that the pressing of hover button 412 completes before the pressing of the area on or near web link 408 begins. Alternatively, these presses can overlap each other, such that the pressing of the area on or near web link 408 begins before the pressing of hover button 412 completes.

Regarding the operation performed based on the hover event, hover content 414 associated with web link 408 can be displayed. As an additional example for FIG. 4C, the respective hover event associated with image 402 can be triggered upon pressing hover button 412 and an area on or near image 402. It should be noted that the display of hover content is one example of an operation performed in association with the hover event, and that other operations opening a menu on a hover) can be performed instead. In another example aspect, if the area on or near web link 408 is pressed while the hover button 412 is not pressed, a regular mouseclick event (e.g., a non-hover event) can be triggered, and a corresponding operation can be performed (e.g., jumping to another web page).

Figure 5:
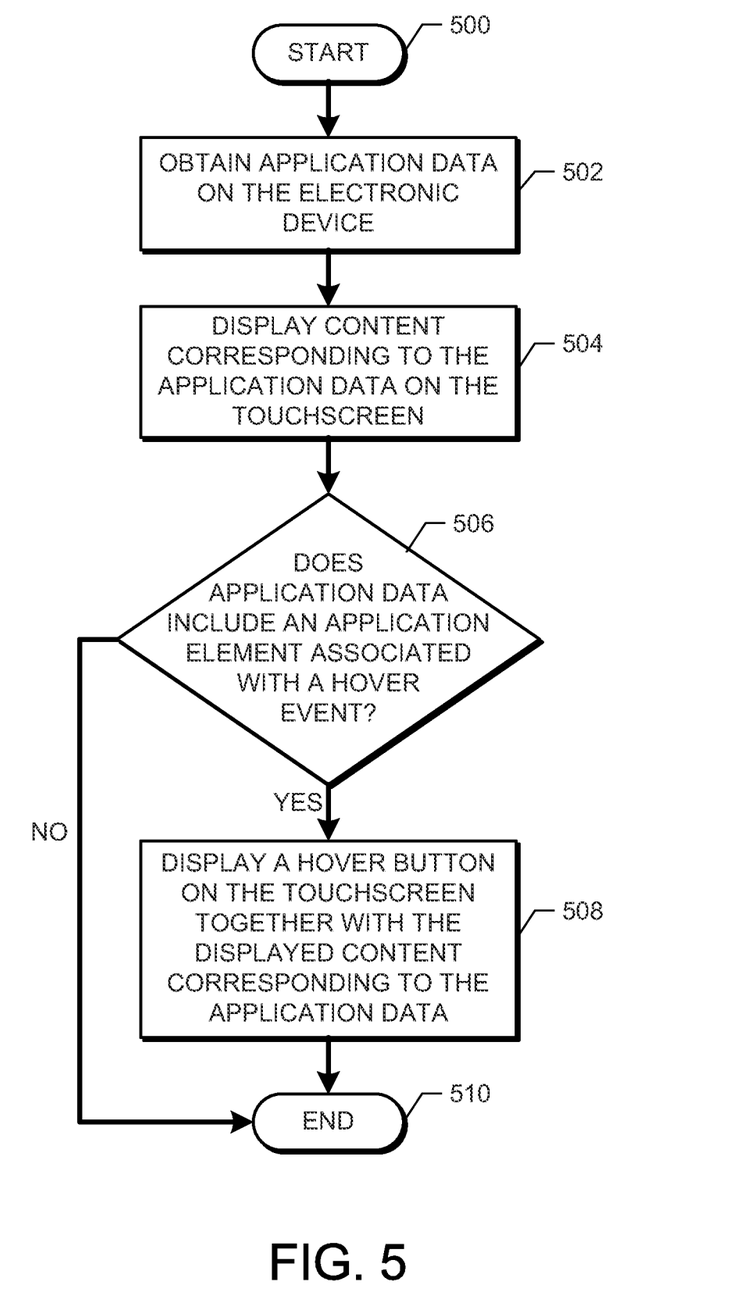
FIG. 5 illustrates an example process by which a hover event is processed on a touchscreen device.

FIG. 5 illustrates an example process by which a hover event is processed on a touchscreen device. Following start block 500, application data is obtained on the touchscreen device at step 502. The application data can correspond to web page data, but is not limited to such.

At step 504, content corresponding to the application data is displayed on a touchscreen of the touchscreen device. At decision step 506, an inquiry is made as to whether the application data includes an application element associated with a hover event. The application element can correspond to a web page element.

If the answer to the inquiry at decision step 506 is yes, a hover button is displayed on the touchscreen together with the displayed content corresponding to the application data at step 508. For example, the hover button can be displayed in a corner of the touchscreen.

Display of the web page element on the touchscreen can be differentiated relative to other displayed content corresponding to the web page data. For example, the web page element can be highlighted on the touchscreen, and/or the other displayed content can be dimmed on the touchscreen. In example aspects, the differentiated display can be in response to receiving a user touch input corresponding to the displayed hover button.

After the hover button is displayed, a first user touch input corresponding to the displayed hover button can be received, and a second user touch input corresponding to the web page element can be received. In response to receiving the first user touch input and the second user touch input, an operation associated with the hover event can be performed.

The first user touch input and the second user touch input can occur at different times, such that the first user touch input completes before the second user touch input begins. Alternatively, the first user touch input and the second user touch input can have overlapping times, such that the second user touch input begins before the first user touch input completes.

The receipt of the first user touch input and the second user touch input correspond to a trigger for the hover event. Performing the operation can include displaying hover content associated with the web page element. The process then ends at end block 510.

If the answer to the inquiry at decision step 506 is no, the process ends at end block 510. For example, if the web page data does not include the web page element associated with the hover event, the process can refrain from displaying a hover button on the touchscreen.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand atone program or as a module, component, subroutine, object, or other unit suitable for use in a computing environment. A computer program may, hut need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 6:
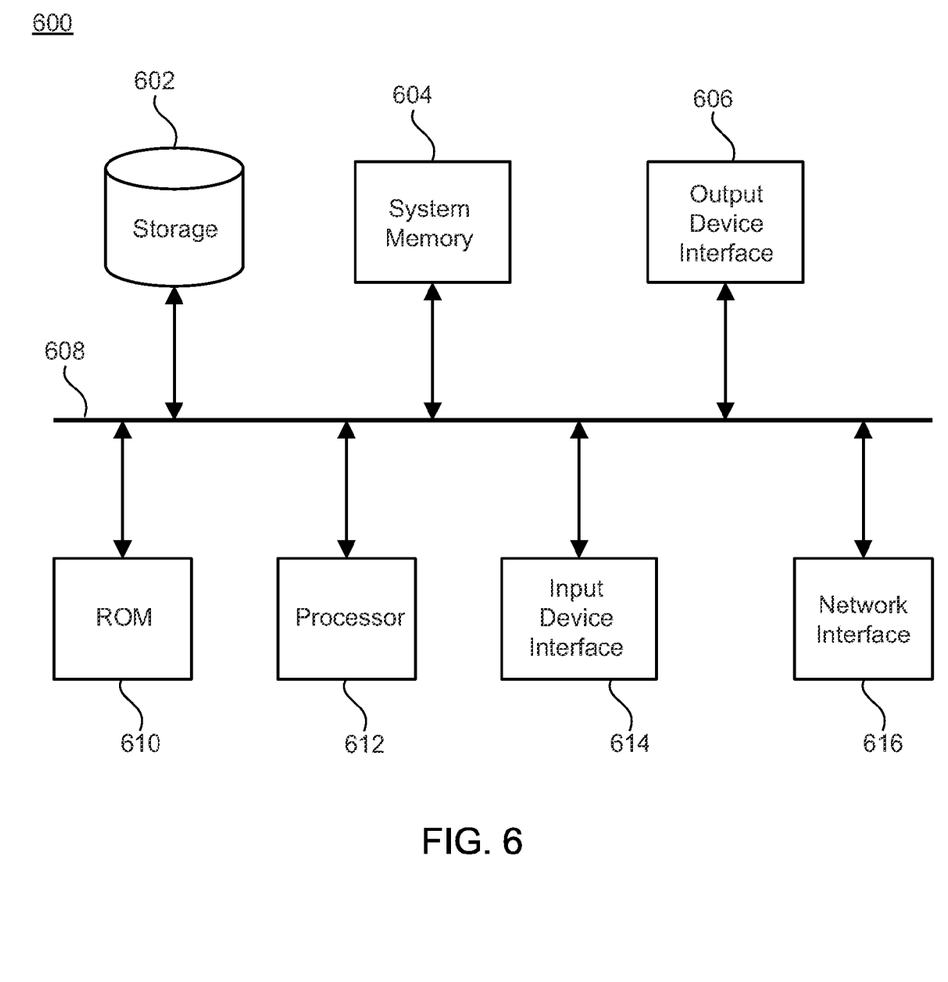
FIG. 6 conceptually illustrates an electronic system with which some implementations of the subject technology are implemented.

FIG. 6 conceptually illustrates an electronic system with which some implementations of the subject technology are implemented. Electronic system 600 can be a computer, phone, PDA, or any other sort of electronic device. Such an electronic system includes various types of computer readable media and interfaces for various other types of computer readable media. Electronic system 600 includes a bus 608, processing unit(s) 612, a system memory 604, a read-only memory (ROM) 610, a permanent storage device 602, an input device interface 614, an output device interface 606, and a network interface 616.

Bus 608 collectively represents all system, peripheral, and chipset buses that communicatively connect the numerous internal devices of electronic system 600. For instance, bus 608 communicatively connects processing unit(s) 612 with ROM 610, system memory 604, and permanent storage device 602.

From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of the electronic system. Permanent storage device 602, on the other hand, is a read-and-write memory device. This device is a non-volatile memory unit that stores instructions and data even when electronic system 600 is off. Some implementations of the subject disclosure use a mass-storage device (such as a magnetic or optical disk and its corresponding disk drive) as permanent storage device 602.

Other implementations use a removable storage device (such as a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such a random access memory. System memory 604 stores some of the instructions and data that the processor needs at runtime. In some implementations, the processes of the subject disclosure are stored in system memory 604, permanent storage device 602, and/or ROM 610. For example, the various memory units include instructions for processing a hover event in accordance with some implementations. From these various memory units, processing unit(s) 612 retrieves instructions to execute and data to process in order to execute the processes of some implementations.

Bus 608 also connects to input and output device interfaces 614 and 606. Input device interface 614 enables the user to communicate information and select commands to the electronic system. Input devices used with input device interface 614 include, for example, alphanumeric keyboards and pointing devices (also called "cursor control devices"). Output device interfaces 606 enables, for example, the display of images generated by the electronic system 600. Output devices used with output device interface 606 include, for example, printers and display devices, such as cathode ray tubes (CRT) or liquid crystal displays (LCD). Some implementations include devices such as a touchscreen that functions as both input and output devices.

Finally, as shown in FIG. 6, bus 608 also couples electronic system 600 to a network (not shown) through a network interface 616. In this manner, the computer can be a part of a network of computers (such as a local area network ("LAN"), a wide area network ("WAN"), or an Intranet, or a network of networks, such as the Internet. Any or all components of electronic system 600 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration," Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A machine-implemented method for processing a hover event on a touchscreen device, the method comprising:
   obtaining web page data on the touchscreen device;
   displaying content corresponding to the web page data on a touchscreen of the touchscreen device;
   determining if the web page data includes a web page element associated with a hover event;
   in response to determining that the web page data includes the web page element associated with the hover event, displaying a hover button concurrently with the web page element on the touchscreen in association with the displayed content corresponding to the web page data without further action by a user, wherein the hover button is displayed in an area of the touchscreen that does not overlay or touch the web page element,
   receiving a first user touch input on the touchscreen on the displayed hover button;
   receiving a second user touch input on the touchscreen corresponding to the web page element while maintaining the first user touch input; and
   performing an operation associated with the hover event in response to receiving the first and second user touch inputs,
   wherein the hover button is not displayed in response to determining that the web page data does not include a web page element associated with a hover event.

2. The method of claim 1, wherein the first user touch input and the second user touch input occur at different times.

3. The method of claim 1, wherein the first user touch input and the second user touch input have overlapping times, such that the second user touch input begins before the first user touch input completes.

4. The method of claim 1, wherein receipt of the first user touch input and the second user touch input correspond to the trigger for the hover event.

5. The method of claim 1, wherein the performing the operation comprises displaying hover content associated with the web page element.

6. The method of claim 1, further comprising providing for differentiated display of the web page element on the touchscreen relative to other displayed content corresponding to the web page data.

7. The method of claim 6, wherein the providing for differentiated display comprises:
   receiving the first user touch input corresponding to the displayed hover button; and
   providing, in response to receiving the first user touch input, for differentiated display of the web page element on the touchscreen relative to other displayed content corresponding to the web page data.

8. The method of claim 6, wherein the web page element is highlighted on the touchscreen.

9. The method of claim 6, wherein the other displayed content is dimmed on the touchscreen.

10. The method of claim 1, wherein the hover button is displayed in a corner of the touchscreen.

11. A touchscreen device, comprising:
    a touchscreen;
    one or more processors; and
    a machine-readable medium comprising instructions stored therein, which when executed by the processors, cause the processors to perform operations comprising:
    obtaining application data;
    displaying content corresponding to the application data on the touchscreen;
    determining if the application data includes an application element associated with a hover event;
    in response to determining that the application data includes the application element associated with the hover event, displaying a hover button concurrently with the application element on the touchscreen in association with the displayed content corresponding to the application data without further action by a user, wherein the hover button is displayed in an area of the touchscreen that does not overlay or touch the application data,
    receiving a first user touch input on the touchscreen on the displayed hover button;
    receiving a second user touch input on the touchscreen corresponding to the application element while maintaining the first user touch input; and
    performing an operation associated with the hover event in response to receiving the first and second user touch inputs,
    wherein the hover button is not displayed in response to determining that the application data does not include an application element associated with a hover event.

12. The touchscreen device of claim 11, wherein the application data comprises web page data, and wherein the application element comprises a web page element.

13. The touchscreen device of claim 11, wherein the first user touch input and the second user touch input occur at different times.

14. The touchscreen device of claim 11, wherein the first user touch input and the second user touch input have overlapping times, such that the second user touch input begins before the first user touch input completes.

15. The touchscreen device of claim 11, wherein receipt of the first user touch input and the second user touch input correspond to the trigger for the hover event.

16. The touchscreen device of claim 11, wherein the performing the operation comprises displaying hover content associated with the application element.

17. A machine-readable medium comprising instructions stored therein, which when executed by a system, cause the system to perform operations comprising:
    obtaining application data;
    displaying content corresponding to the application data on a touchscreen;
    determining if the application data includes an application element associated with a hover event;
    in response to determining that the application data includes the application element associated with the hover event, displaying a hover button concurrently with the application element on the touchscreen in association with the displayed content corresponding to the application data without further action by a user wherein the hover button is displayed in an area of the touchscreen that does not overlay or touch the application data,
receiving a first user touch input on the touchscreen on the displayed hover button;
receiving a second user touch input on the touchscreen corresponding to the application element while maintaining the first user touch input; and
performing, an operation associated with the hover event in response to receiving the first and second user touch inputs,
wherein the hover button is not displayed in response to determining that the application data does not include an application element associated with a hover event.

* * * * *